United States Patent
Yeh

(10) Patent No.: US 10,030,832 B1
(45) Date of Patent: Jul. 24, 2018

(54) DETACHABLE WARNING LAMP

(71) Applicant: Neng-Chen Yeh, Tainan (TW)

(72) Inventor: Neng-Chen Yeh, Tainan (TW)

( * ) Notice: Subject to any disclaimer, the term of this patent is extended or adjusted under 35 U.S.C. 154(b) by 0 days.

(21) Appl. No.: 15/792,931

(22) Filed: Oct. 25, 2017

(51) Int. Cl.
| | |
|---|---|
| *B60Q 1/26* | (2006.01) |
| *F21S 10/06* | (2006.01) |
| *G08B 5/38* | (2006.01) |
| *F21V 17/10* | (2006.01) |
| *F21V 17/16* | (2006.01) |
| *F21S 8/10* | (2006.01) |
| *F21V 17/12* | (2006.01) |
| *F21S 41/141* | (2018.01) |

(52) U.S. Cl.
CPC ............ *F21S 10/06* (2013.01); *F21V 17/104* (2013.01); *F21V 17/164* (2013.01); *G08B 5/38* (2013.01); *F21S 41/141* (2018.01); *F21S 48/115* (2013.01); *F21V 17/12* (2013.01)

(58) Field of Classification Search
CPC ...... F21S 10/063; F21S 10/066; F21S 41/141; F21V 17/104; F21V 17/12; F21V 17/164; G08B 5/36; G08B 5/38

USPC .................................................. 362/540–548
See application file for complete search history.

(56) References Cited

U.S. PATENT DOCUMENTS 5,452,188 A * 9/1995 Green .................. B60Q 1/2611
362/493

* cited by examiner

*Primary Examiner* — Jason Moon Han
(74) *Attorney, Agent, or Firm* — Tracy Heims; Apex Jurls, pllc

(57) ABSTRACT

A detachable warning lamp has a base, a light-emitting module disposed on the base, and a cover disposed on the base. The base has two retaining walls and two engaging grooves. The light-emitting module has a circuit board disposed on the base and multiple light-emitting elements. The light-emitting elements are electrically connected to the circuit board and are respectively detachably disposed on the base. Each one of the light-emitting elements has a first engaging portion inserted into a corresponding one of the two engaging grooves, multiple first cushioning lugs abutting a corresponding one of the two retaining walls, a second engaging portion, and multiple second cushioning lugs. The cover has two baffles abutting the second cushioning lugs and two stopping surfaces abutting the second engaging portion. The light-emitting elements are detachably engaged on the base without the use of a screw and a hand tool.

4 Claims, 7 Drawing Sheets

DETACHABLE WARNING LAMP

BACKGROUND OF THE INVENTION

1. Field of the Invention

The present invention relates to a detachable warning lamp, and more particularly to a detachable warning lamp that is convenient to detach.

2. Description of Related Art

A conventional detachable warning lamp has a base, a light-emitting module, and a cover. The base has a chamber, two side surfaces, a top surface, two side openings, and a top opening. The chamber is formed in the base. The two side surfaces are opposite to each other. The top surface is connected to the two side surfaces. The two side openings are respectively formed on the two side surfaces of the base, and are in communication with the chamber of the base. The top opening is formed through the top surface of the base and is in communication with the chamber. The base has two mounting plates. The two mounting plates are disposed in the chamber of the base, and respectively face the two side openings of the base. The light-emitting module is disposed on the base and has a circuit board and multiple light-emitting elements. The circuit board is disposed in the chamber of the base. The light-emitting elements are screwed on the two mounting plates and face an adjacent one of the side openings. The light-emitting elements are electrically connected to the circuit board. The cover is disposed on the base and covers the top opening of the base.

The light-emitting elements are detachably disposed on the two mounting plates of the base. In assembly, a hand tool is controlled by users for driving the screws. The light-emitting elements are screwed on the two mounting plates by the screws. In disassembly, the screws are detached from the two mounting plates by the hand tool, and then the light-emitting elements are detached from the two mounting plates.

Mounting the light-emitting elements on the two mounting plates by the screws is time-consuming since the light emitting elements are fixed one by one. In addition, the light-emitting elements are detached from the two mounting plates by loosening the screws. The detachment of the light-emitting elements is time-consuming as well and thus the detachable warning lamp is inconvenient in use.

To overcome the shortcomings, the present invention provides a detachable warning lamp to mitigate or obviate the aforementioned problems.

SUMMARY OF THE INVENTION

The objective of the invention is to provide a detachable warning lamp that can be easily assembled and save time.

The detachable warning lamp has a base, a light-emitting module, and a cover.

The base has a chamber, two side surfaces, a top surface, an inner bottom surface, two side openings, a top opening, two retaining walls, and two engaging grooves. The chamber is formed in the base. The two side surfaces of the base are opposite to each other. The top surface of the base is formed across the two side surfaces of the base. The inner bottom surface of the base is formed in the base and is disposed adjacent to the chamber of the base. The two side openings are respectively formed through the two side surfaces of the base and are in communication with the chamber of the base. The top opening is formed through the top surface of the base and is in communication with the chamber of the base. The two retaining walls are formed on the inner bottom surface of the base adjacent to the two side openings of the base respectively. The two engaging grooves are formed on the inner bottom surface of the base adjacent to the two side openings of the base respectively. Each one of the two engaging grooves is respectively located between a corresponding one of the two retaining walls and a corresponding one of the two side openings of the base.

The light-emitting module is disposed on the base and has a circuit board and multiple light-emitting elements. The circuit board is disposed on the base and is located in the chamber of the base. The light-emitting elements are electrically connected to the circuit board and are detachably disposed in the two side openings of the base. Each one of the light-emitting elements has a shell, a first engaging portion, multiple first cushioning lugs, a second engaging portion, and multiple second cushioning lugs. The shell has a bottom surface, a top surface, and a rear surface. The first engaging portion is formed on the bottom surface of the shell and is inserted into a corresponding one of the two engaging grooves. The first cushioning lugs are formed on and protrude out of the rear surface of the shell. The first cushioning lugs abut a corresponding one of the two retaining walls. The second engaging portion is formed on the top surface of the shell and is located above the first engaging portion. The second cushioning lugs are formed on and protrude out of the rear surface of the shell, and are located above the first cushioning lugs.

The cover is disposed on the base, covers the top opening of the base, and has an inner bottom surface, two baffles, and two stopping surfaces. The inner bottom surface of the cover faces the inner bottom surface of the base. The two baffles are formed on the inner bottom surface of the cover and are respectively disposed adjacent to the side openings of the base, and each baffle abuts the second cushioning lugs of a corresponding one of the light-emitting elements. The two stopping surfaces are formed on the inner bottom surface of the cover and respectively face the two baffles, and each stopping surface abuts the second engaging portion of a corresponding one of the light-emitting elements.

In assembly, one by one the light-emitting elements are detachably engaged with the base. In each one of the light-emitting elements, each one of the first cushioning lugs abuts the corresponding one of the two retaining walls of the base and is deformed for providing a restoring force. The first engaging portion is inserted into the corresponding one of the two engaging grooves of the base. The light-emitting elements can be engaged with and retained on the base. The cover is disposed on the base and covers the light-emitting elements. The light-emitting elements are disposed between the base and the cover. In each one of the light-emitting elements, each one of the second cushioning lugs abuts the corresponding one of the two baffles of the cover. The second engaging portion abuts the corresponding one of the two stopping surfaces of the cover. Therefore, the light-emitting elements are easy to assemble, and the assembly time of the light-emitting elements is saved.

For disassembly, the cover is detached from the base. The light-emitting elements may be pushed toward the chamber. The first cushioning lugs of the light-emitting elements are deformed. The first engaging portions of the light-emitting elements move out of the engaging grooves by the movements of the light-emitting elements. The light-emitting elements can be detached from the base. Therefore, the light-emitting elements are easy to detach, saving the time for disassembly.

Accordingly, the light-emitting elements are detachably engaged with the base without the use of a screw and a hand tool. The detachable warning lamp is easy to assemble and detach, saving the time for assembly and disassembly.

Other objectives, advantages and novel features of the invention will become more apparent from the following detailed description when taken in conjunction with the accompanying drawings.

DETAILED DESCRIPTION OF THE PREFERRED EMBODIMENT

Figure 1:
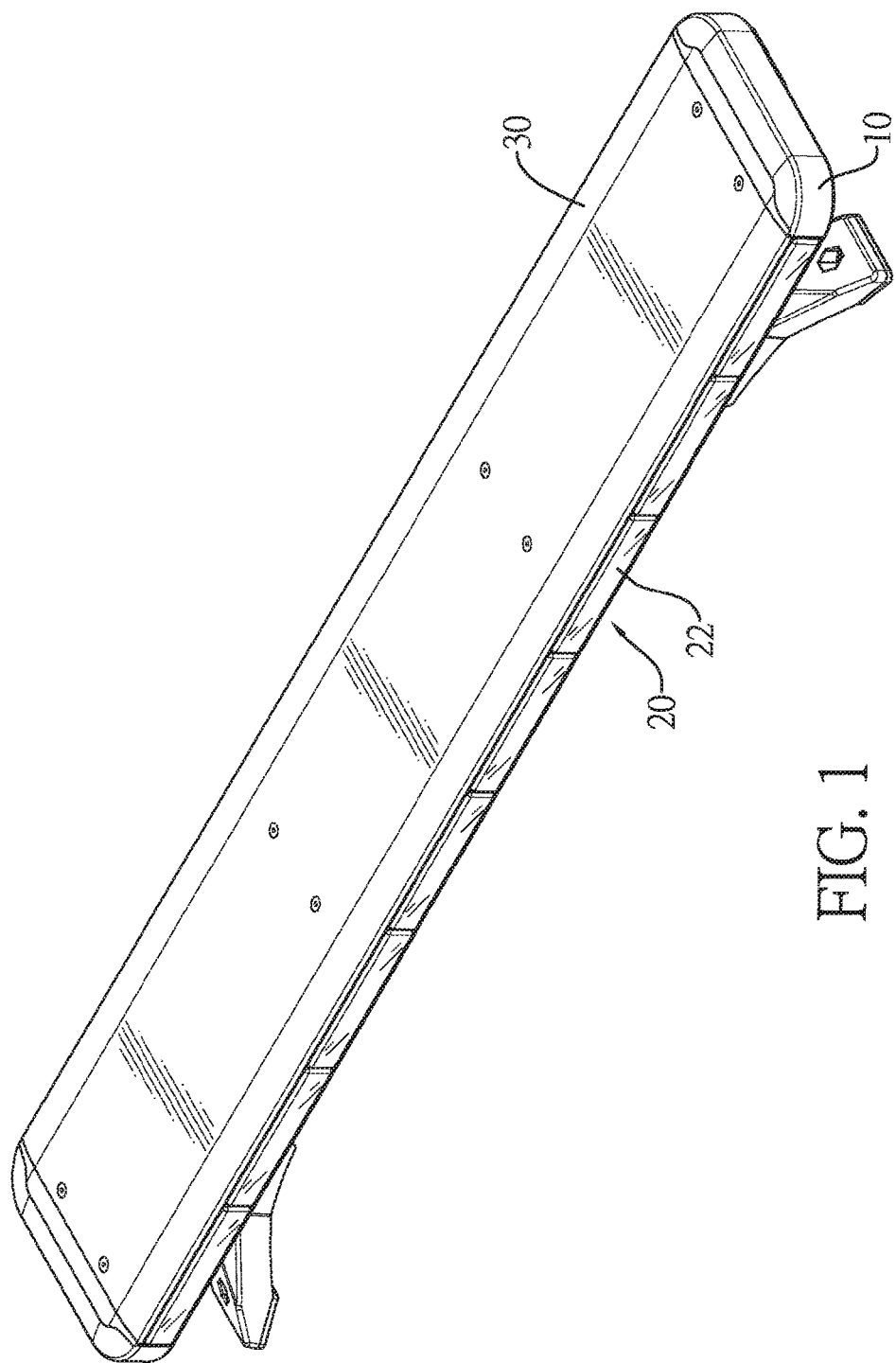
FIG. 1 is a perspective view of a detachable warning lamp in accordance with the present invention.
Figure 2:
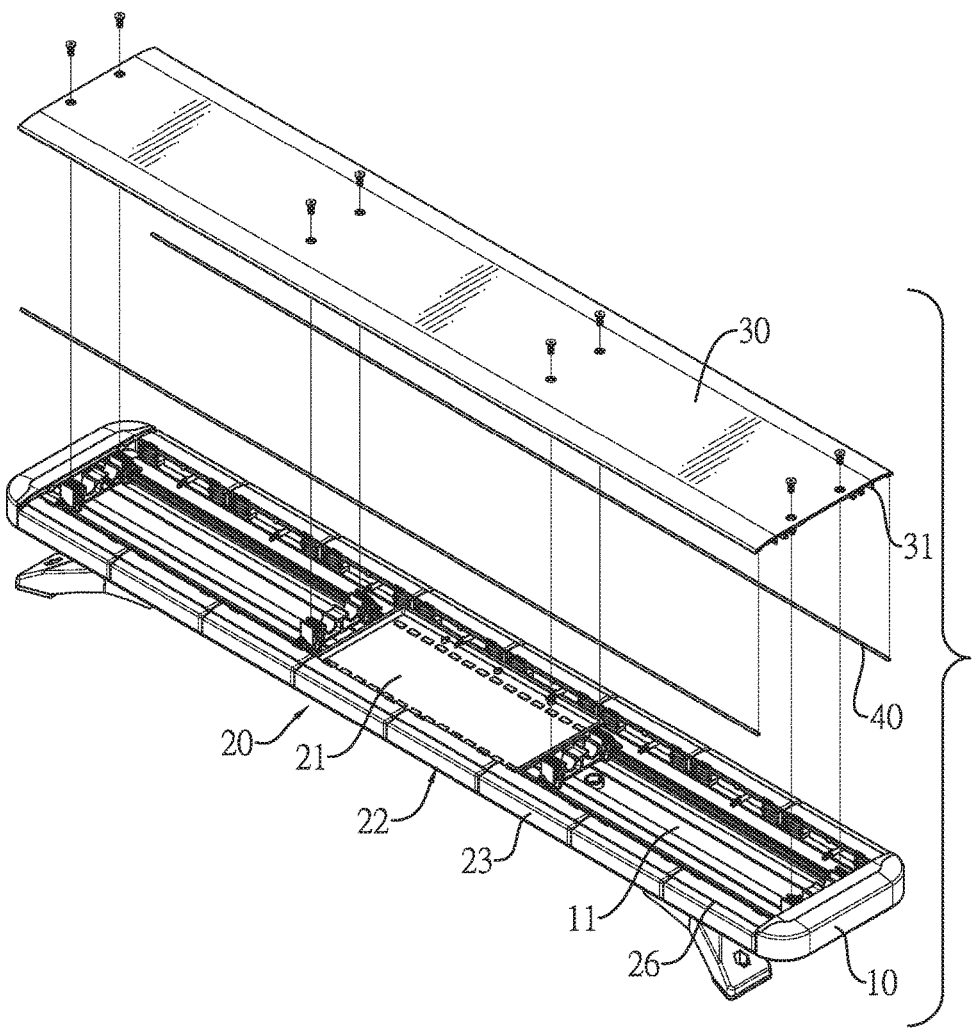
FIG. 2 is an exploded perspective view of the detachable warning lamp in FIG. 1.
Figure 3:
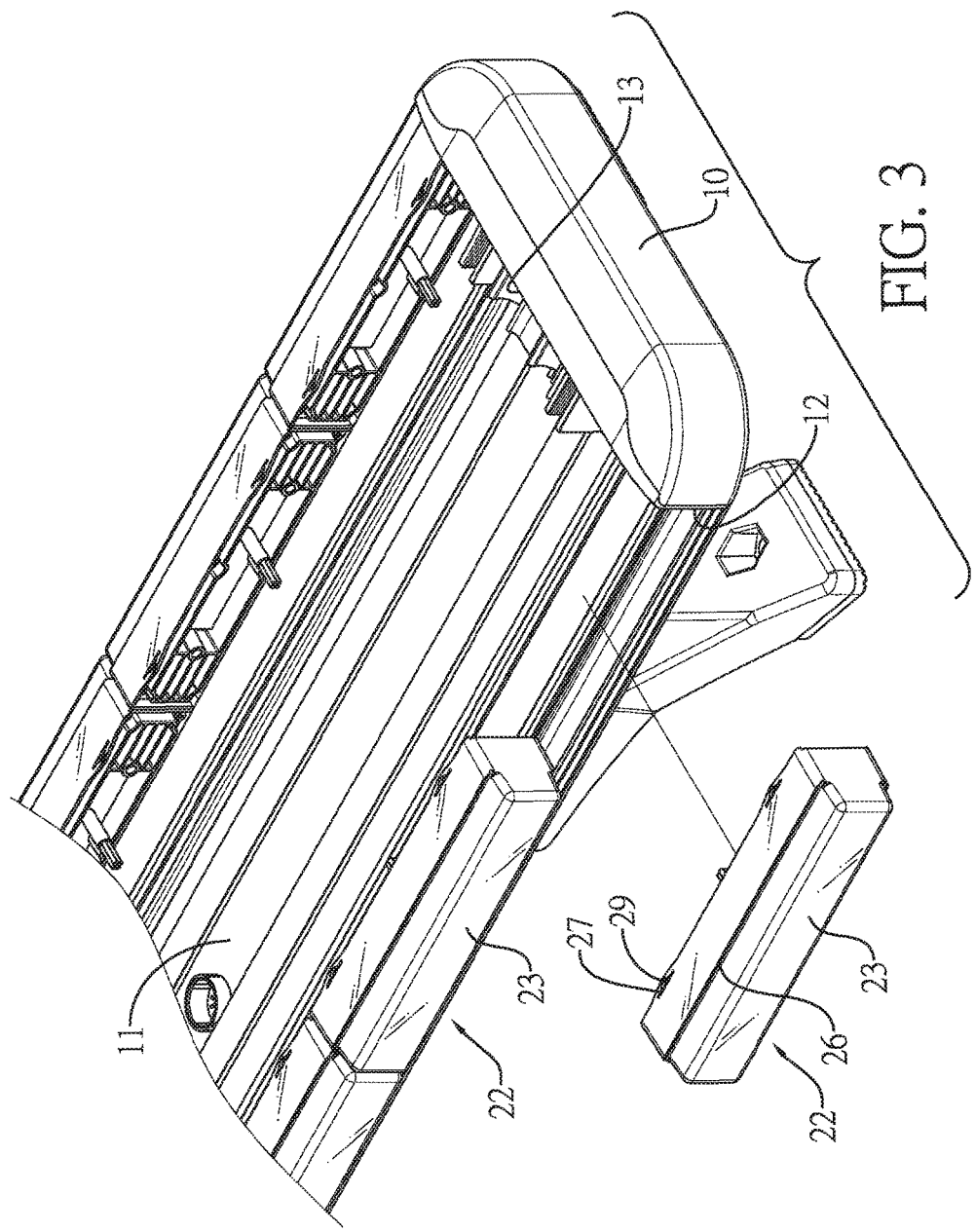
FIG. 3 is an enlarged exploded perspective view of the detachable warning lamp in FIG. 2.

With reference to FIGS. 1 to 3, a detachable warning lamp in accordance with the present invention comprises a base 10, a light-emitting module 20, and a cover 30.

Figure 6:
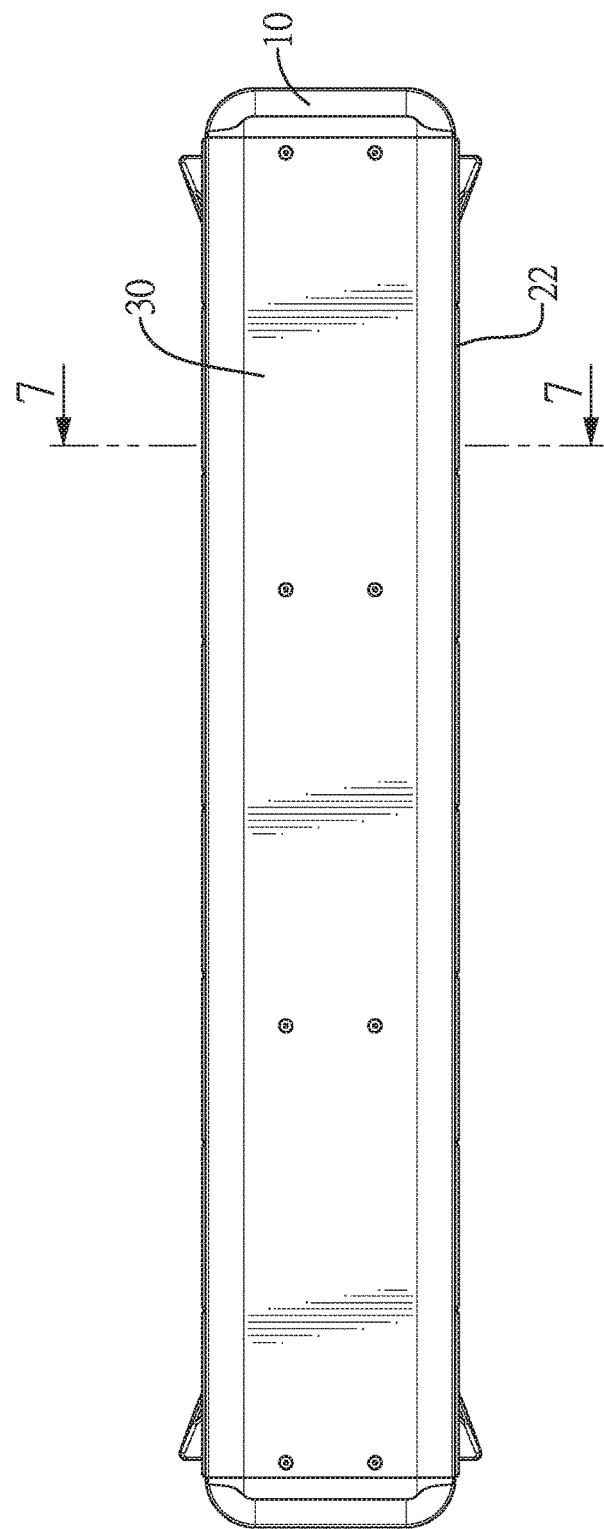
FIG. 6 is a top side view of the detachable warning lamp in FIG. 1.
Figure 7:
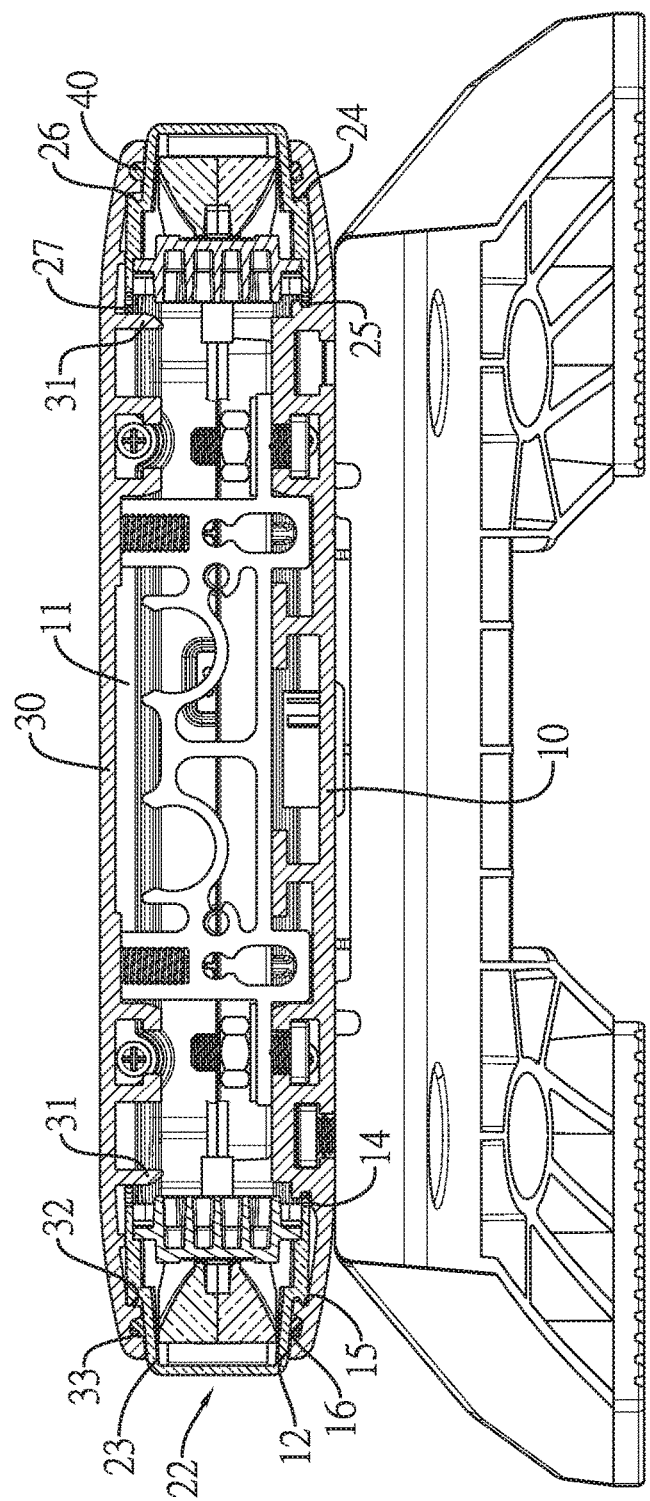
FIG. 7 is a cross sectional side view of the detachable warning lamp along line 7-7 in FIG. 6.

With reference to FIGS. 3, 6, and 7, the base 10 has a chamber 11, two side surfaces, a top surface, an inner bottom surface, two side openings 12, a top opening 13, two retaining walls 14, and two engaging grooves 15. The chamber 11 is formed in the base 10. The two side surfaces of the base 10 are opposite to each other. The top surface of the base 10 is formed across the two side surfaces of the base 10. The inner bottom surface of the base 10 is formed in the base 10 and is disposed adjacent to the chamber 11 of the base 10.

The two side openings 12 are respectively formed through the two side surfaces of the base 10, and are in communication with the chamber 11 of the base 10. The top opening 13 is formed through the top surface of the base 10 and is in communication with the chamber 11 of the base 10. The two retaining walls 14 are formed on the inner bottom surface of the base 10 adjacent to the two side openings 12 of the base 10 respectively. The two engaging grooves 15 are formed on the inner bottom surface of the base 10 adjacent to the two side openings 12 of the base 10 respectively. Each one of the two engaging grooves 15 is respectively located between a corresponding one of the two retaining walls 14 of the base 10 and a corresponding one of the two side openings 12 of the base 10.

With reference to FIGS. 2 and 7, the light-emitting module 20 is disposed on the base 10 and has a circuit board 21 and multiple light-emitting elements 22. The circuit board 21 is disposed on the base 10, and is located in the chamber 11 of the base 10. The light-emitting elements 22 are electrically connected to the circuit board 21 and are detachably disposed in the two side openings 12 of the base 10.

Figure 8:
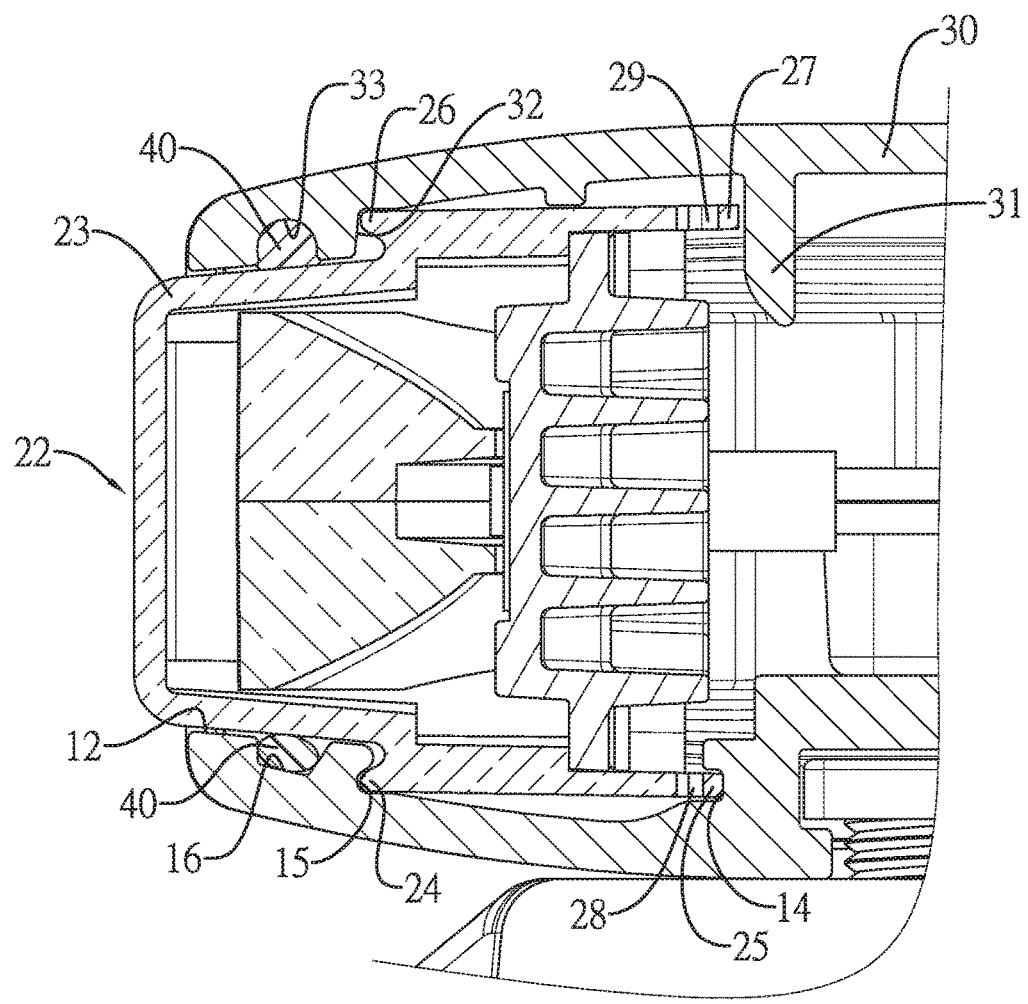
FIG. 8 is an enlarged cross sectional side view of the detachable warning lamp in FIG. 7.

With reference to FIGS. 4, 5, 7, and 8, each one of the light-emitting elements 22 has a shell 23, a first engaging portion 24, multiple first cushioning lugs 25, a second engaging portion 26, and multiple second cushioning lugs 27. The shell 23 has a bottom surface, a top surface, and a rear surface. The first engaging portion 24 is formed on the bottom surface of the shell 23 and is inserted into a corresponding one of the two engaging grooves 15. The first cushioning lugs 25 are formed on and protrude out of the rear surface of the shell 23. The first cushioning lugs 25 abut a corresponding one of the two retaining walls 14. The second engaging portion 26 is formed on the top surface of the shell 23, and is located above the first engaging portion 24. The second cushioning lugs 27 are formed on and protrude out of the rear surface of the shell 23, and are located above the first cushioning lugs 25. With reference to FIGS. 7 and 8, the cover 30 is disposed on the base 10, covers the top opening 13 of the base 10, and has an inner bottom surface, two baffles 31, and two stopping surfaces 32. The inner bottom surface of the cover 30 faces the inner bottom surface of the base 10. The two baffles 31 are formed on the inner bottom surface of the cover 30 and are respectively disposed adjacent to the side openings 12 of the base 10, and each baffle 31 abuts the second cushioning lugs 27 of a corresponding one of the light-emitting elements 22. The two stopping surfaces 32 are formed on the inner bottom surface of the cover 30 and respectively face the two baffles 31, and each stopping surface 32 abuts the second engaging portion 26 of a corresponding one of the light-emitting elements 22.

With reference to FIGS. 7 and 8, the base 10 has two first leak-proof grooves 16. The two first leak-proof grooves 16 are formed on the inner bottom surface of the base 10, and are located between the two engaging grooves 15 and the two side openings 12 of the base 10. The cover 30 has two second leak-proof grooves 33. The two second leak-proof grooves 33 are formed on the inner bottom surface of the cover 30, and are located between the two stopping surfaces 32 of the cover 30 and the two side openings 12 of the base 10. Furthermore, the detachable warning lamp has four waterproof strips 40. The four waterproof strips 40 are respectively disposed on the two first leak-proof grooves 16 of the base 10 and the two second leak-proof grooves 33 of the cover 30.

Figure 4:
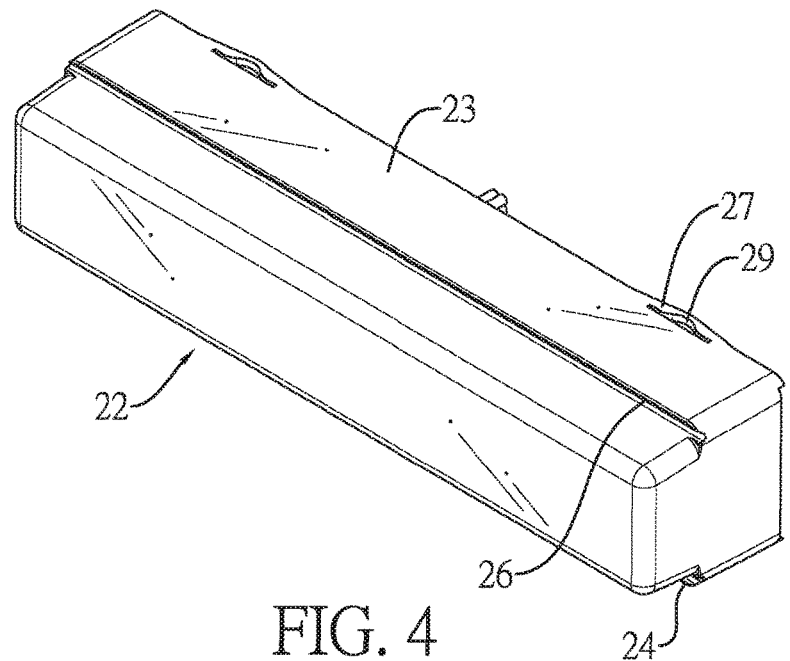
FIG. 4 is a perspective view of a light-emitting element of the detachable warning lamp in FIG. 3.
Figure 5:
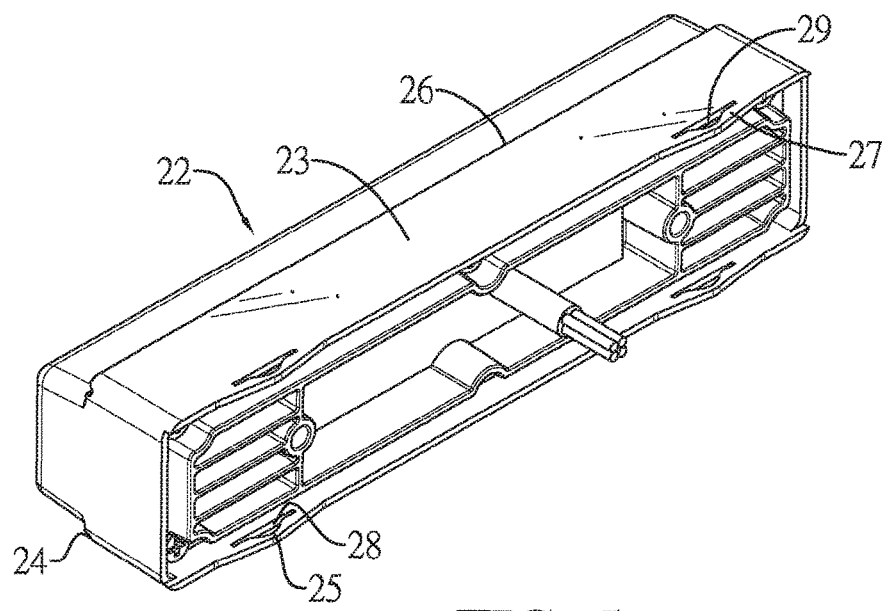
FIG. 5 is another perspective view of the light-emitting element of the detachable warning lamp in FIG. 3.

With reference to FIGS. 4 and 5, each one of the light-emitting elements 22 has multiple first deforming spaces 28 and multiple second deforming spaces 29. The first deforming spaces 28 are respectively formed between the first cushioning lugs 25 and the rear surface of the shell 23. The second deforming spaces 29 are respectively formed between the second cushioning lugs 27 and the rear surface of the shell 23.

In assembly, the light-emitting elements 22 are detachably engaged with the base 10 one by one, and then the cover 30 is disposed on the base 10. The light-emitting elements 22 are disposed between the base 10 and the cover 30 for fixing the light-emitting elements 22. In each one of the light-emitting elements 22, the first cushioning lugs 25 abut the retaining walls 14 of the base 10. Each one of the light-emitting elements 22 is pushed by the users. Each one of the first cushioning lugs 25 is deformed and provides a restoring force. The first engaging portion 24 is inserted into the corresponding one of the two engaging grooves 15. Each one of the light-emitting elements 22 is moved out of the base 10 by the restoring force. The light-emitting elements 22 are engaged with and retained on the base 10. The cover 30 is disposed on the base 10 and covers the light-emitting elements 22. The second cushioning lugs 27 of the light-emitting elements 22 abut the baffles 31 of the cover 30. The second engaging portions 26 of the light-emitting elements 22 abut the stopping surfaces 32 of the cover 30. The light-emitting elements 22 firmly abut and are retained below the cover 30.

For disassembly, the cover 30 is detached from the base 10 by the users. The light-emitting elements 22 are detached from the base 10 by the users without a hand tool. Each one of the light-emitting elements 22 is pushed by a hand of the users and is moved. The first cushioning lugs 25 of each one of the light-emitting elements 22 are deformed. The first engaging portion 24 of each one of the light-emitting elements 22 moves out of the corresponding one of the engaging grooves 15. Each one of the light-emitting elements 22 is lifted and is detached from the base 10 manually by the users.

Accordingly, the retaining walls 14 and the engaging grooves 15 are formed on the base 10. The first engaging portion 24 and the first cushioning lugs 25 are formed on each one of the light-emitting elements 22. The light-emitting elements 22 are easy to assemble and detach without the use of a screw and the hand tool. The assembly and the disassembly of the detachable warning lamp are convenient and quick, saving time for assembly and disassembly.

In addition, the waterproof strips 40 prevent the mist or a foreign object from going into the chamber 11 of the base 10. Furthermore, the first cushioning lugs 25 and the second cushioning lugs 27 can be deformed in assembly and provide the restoring force for increasing the assembly stability of the detachable warning lamp.

What is claimed is:

1. A detachable warning lamp comprising:
   a base having
      a chamber formed in the base;
      two side surfaces being opposite to each other;
      a top surface formed across the two side surfaces of the base;
      an inner bottom surface formed in the base and disposed adjacent to the chamber;
      two side openings respectively formed through the two side surfaces of the base and communicating with the chamber of the base;
      a top opening formed through the top surface of the base and communicating with the chamber of the base;
      two retaining walls formed on the inner bottom surface of the base adjacent to the two side openings of the base respectively; and
      two engaging grooves formed on the inner bottom surface of the base adjacent to the two side openings of the base respectively, and each one of the two engaging grooves respectively located between a corresponding one of the two retaining walls and a corresponding one of the two side openings of the base;
   a light-emitting module disposed on the base, and having
      a circuit board disposed on the base and located in the chamber of the base; and
      multiple light-emitting elements electrically connected to the circuit board and detachably disposed in the two side openings of the base, and each one of the light-emitting elements having
         a shell having a bottom surface, a top surface, and a rear surface;
         a first engaging portion formed on the bottom surface of the shell and inserted into a corresponding one of the two engaging grooves;
         multiple first cushioning lugs formed on and protruding out of the rear surface of the shell, and abutting a corresponding one of the two retaining walls;
         a second engaging portion formed on the top surface of the shell and located above the first engaging portion; and
         multiple second cushioning lugs formed on and protruding out of the rear surface of the shell, and located above the first cushioning lugs; and
   a cover disposed on the base, covering the top opening of the base, and having
      an inner bottom surface facing the inner bottom surface of the base;
      two baffles formed on the inner bottom surface of the cover and respectively disposed adjacent to the side openings of the base, and each baffle abutting the second cushioning lugs of a corresponding one of the light-emitting elements; and
      two stopping surfaces formed on the inner bottom surface of the cover and respectively facing the two baffles, and each stopping surface abutting the second engaging portion of a corresponding one of the light-emitting elements.

2. The detachable warning lamp as claimed in claim 1, wherein
   the base has two first leak-proof grooves formed on the inner bottom surface of the base and located between the two engaging grooves and the two side openings of the base;
   the cover has two second leak-proof grooves formed on the inner bottom surface of the cover and located between the two stopping surfaces of the cover and the two side openings of the base; and
   the detachable warning lamp has four waterproof strips respectively disposed on the two first leak-proof grooves of the base and the two second leak-proof grooves of the cover.

3. The detachable warning lamp as claimed in claim 1, wherein each one of the light-emitting elements has
   multiple first deforming spaces respectively formed between the first cushioning lugs and the rear surface of the shell; and
   multiple second deforming spaces respectively formed between the second cushioning lugs and the rear surface of the shell.

4. The detachable warning lamp as claimed in claim 2, wherein each one of the light-emitting elements has
   multiple first deforming spaces respectively formed between the first cushioning lugs and the rear surface of the shell; and
   multiple second deforming spaces respectively formed between the second cushioning lugs and the rear surface of the shell.

* * * * *